May 30, 1939.　　　　G. S. SCHAIRER　　　　2,160,089
AIRPLANE
Filed Feb. 12, 1937　　　6 Sheets-Sheet 1
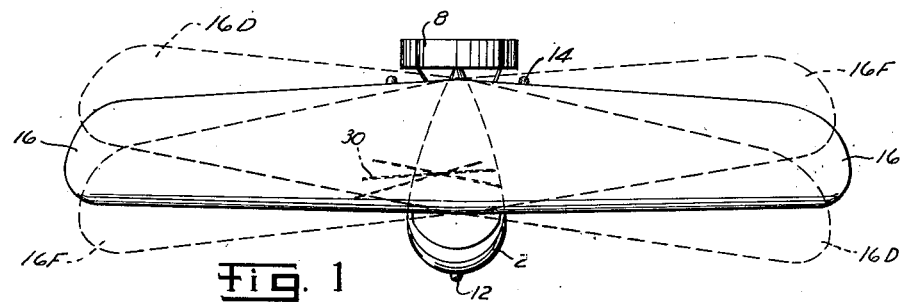
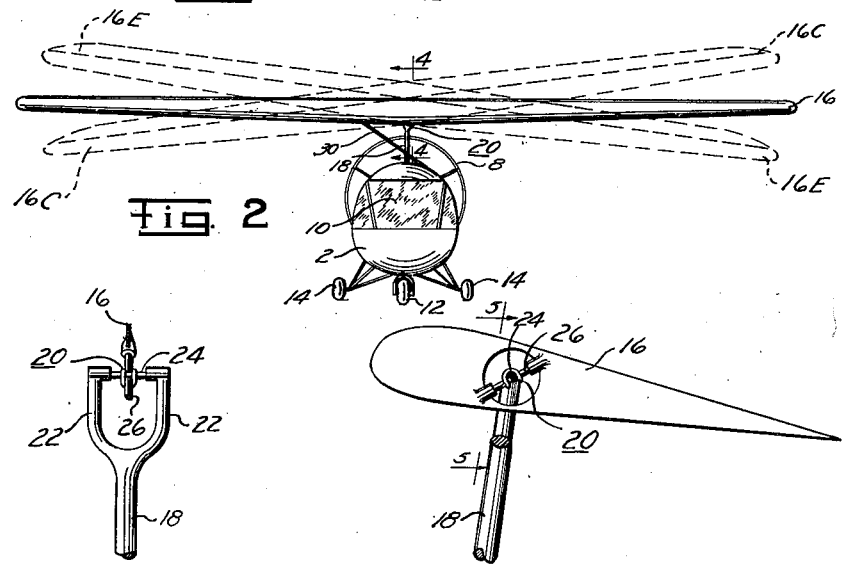
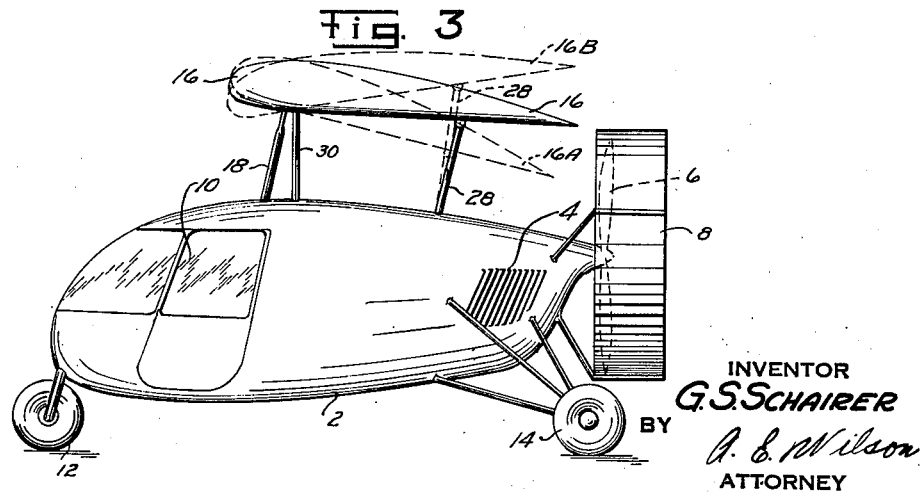
INVENTOR
G. S. SCHAIRER
BY
A. E. Wilson
ATTORNEY May 30, 1939. G. S. SCHAIRER 2,160,089
AIRPLANE
Filed Feb. 12, 1937 6 Sheets-Sheet 2

INVENTOR
Geo. S. Schairer
BY
A. E. Wilson
ATTORNEY

May 30, 1939. G. S. SCHAIRER 2,160,089
AIRPLANE
Filed Feb. 12, 1937 6 Sheets-Sheet 3

INVENTOR
Geo. S. Schairer
BY
A. E. Wilson
ATTORNEY

May 30, 1939.  G. S. SCHAIRER  2,160,089
AIRPLANE
Filed Feb. 12, 1937  6 Sheets-Sheet 4
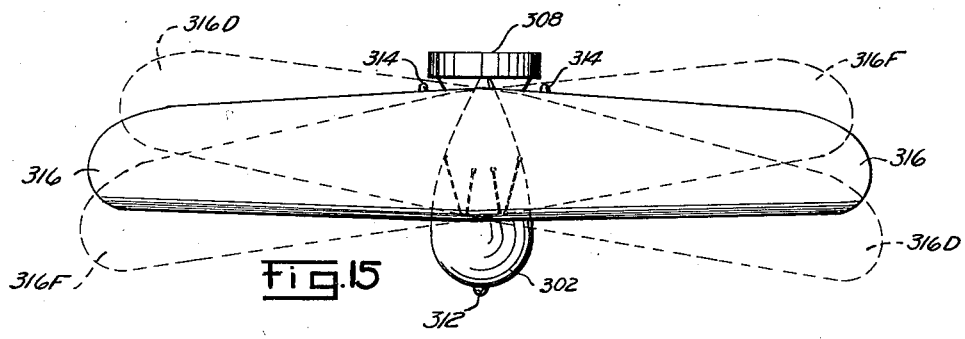
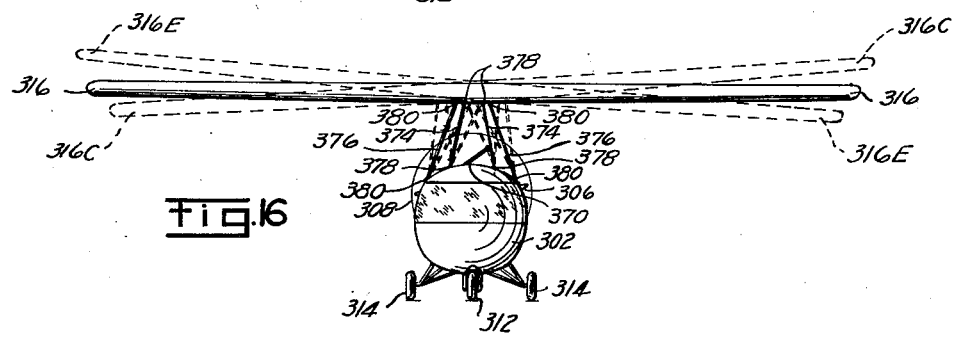
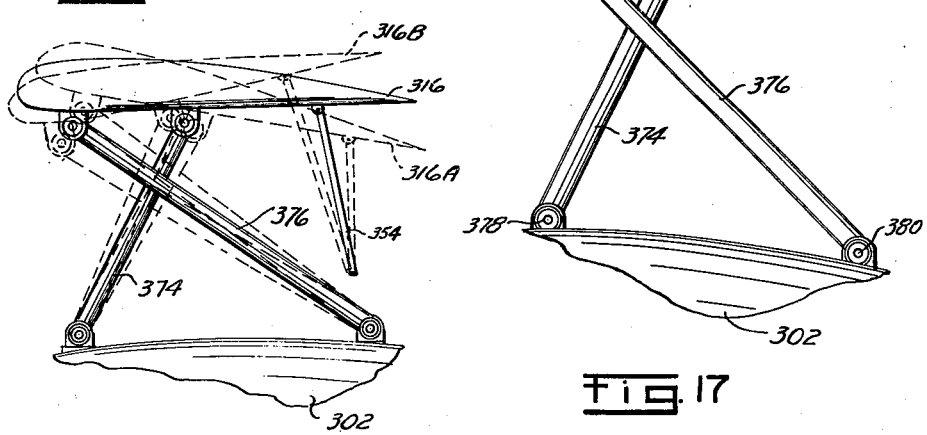
INVENTOR
GEO. S. SCHAIRER
BY
ATTORNEY May 30, 1939.  G. S. SCHAIRER  2,160,089
AIRPLANE
Filed Feb. 12, 1937   6 Sheets-Sheet 5

INVENTOR
Geo. S. Schairer
BY
ATTORNEY

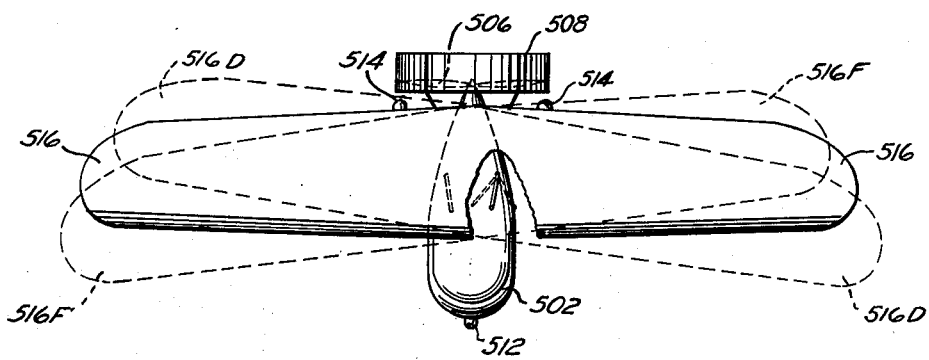
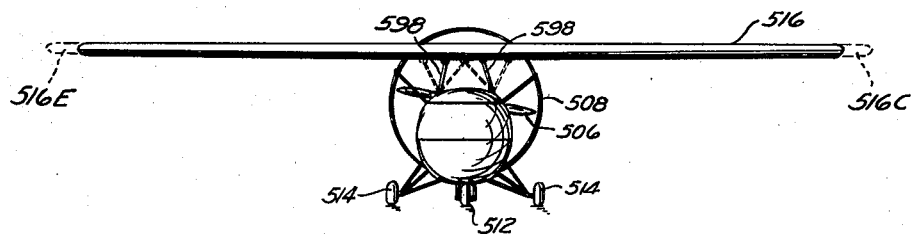
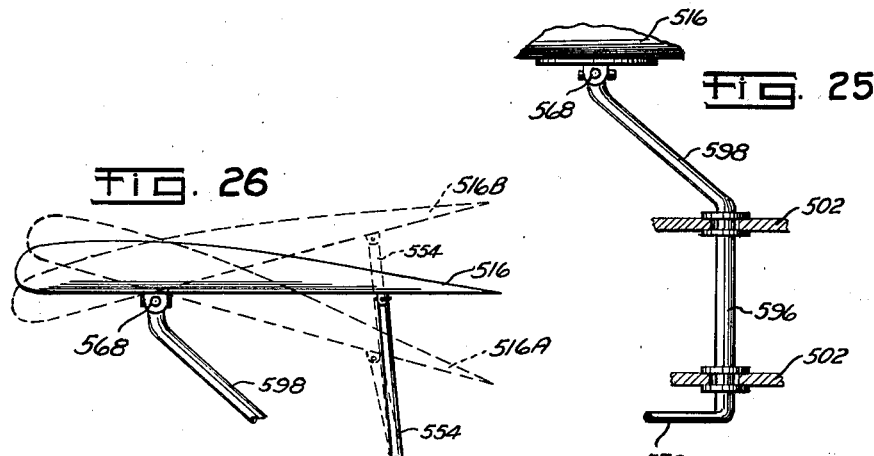

Patented May 30, 1939

2,160,089

UNITED STATES PATENT OFFICE 2,160,089

AIRPLANE

George S. Schairer, South Bend, Ind., assignor to Bendix Products Corporation, South Bend, Ind., a corporation of Indiana Application February 12, 1937, Serial No. 125,438

3 Claims. (Cl. 244—83)

This invention relates to aircraft, and more particularly to means for controlling aircraft.

It has been found that the so-called fixed wing type of aircraft, wherein the wings or supporting surfaces are constantly maintained in a fixed position and at a fixed angle with reference to the fuselage of the craft, is subject to certain undesirable characteristics. Notable among the disadvantages of this type of craft is the fact that to directionally control the craft is is necessary to provide auxiliary force applying means positioned at a sufficient distance from the main supporting means to interpose a couple or lever force to influence the operation of the main supporting means to directionally control the craft.

It has been found that aircraft may be directionally controlled more advantageously by interconnecting the main supporting means and the fuselage in such a manner that the angle of attack of the main supporting means may be varied with reference to the fuselage to control the craft longitudinally, and the longitudinal axis of the main supporting means may be varied with reference to the fuselage to control the craft laterally.

An object of this invention is therefore to provide means to vary the relation between the fuselage and the main supporting means of aircraft to control the craft.

A further object of the invention is to provide means to vary the angle of attack of the main supporting means with reference to the fuselage of aircraft to effect longitudinal control of the craft.

Another object of the invention is to provide means to effect a lateral shifting of the main supporting means with reference to the fuselage of aircraft to effect lateral control thereof.

A still further object of the invention is to provide means to effect lateral displacement between the main supporting means and the fuselage of aircraft, accompanied by simultaneous yawing of the fuselage with reference to the main supporting means to control the craft.

Yet a further object of the invention is to provide means for lifting or rolling the fuselage of aircraft with reference to the main supporting means to effect lateral control of the craft.

Another object is to provide lateral aircraft control means wherein the craft tends to return to the neutral position.

A further object of the invention is to provide manually operable means to vary the angle of attack of the main supporting wing with reference to a directionally stable aircraft fuselage to control the craft longitudinally.

Yet a still further object of this invention is to provide manually operable means to effect a lifting or rolling action of a directionally stable air craft fuselage with reference to the main supporting wing to accompany lateral control of the craft.

Another object of the invention is to provide means for laterally displacing the main supporting means with reference to the fuselage of an aircraft, and rotating the main supporting means with reference to the fuselage to effect lateral control of the craft.

Other objects and advantages of this invention will be apparent from the following detailed description of several desirable embodiments thereof, considered in connection with the accompanying drawings, submitted for purposes of illustration only and not intended to define the scope of the invention, reference being had for that purpose to the subjoined claims.

In the drawings, wherein similar reference characters refer to similar parts throughout the several views:

Figure 1 is a plan view of an aircraft showing one desirable embodiment of the present invention;

Figure 2 is a front elevation of the craft shown in Figure 1;

Figure 3 is a side elevation of the craft illustrated in Figures 1 and 2 showing the wing in three operative positions;

Figure 4 is a vertical section of the connecting means between the main supporting wing and the fuselage of the craft;

Figure 5 is a vertical section of the connection shown in Figure 4 taken on a plane at right angles to Figure 4;

Figure 15 is a plan view of another desirable embodiment of the invention;

Figure 16 is a front elevation of the embodiment shown in Figure 15;

Figure 17 is a side elevation of the connecting means between the wing and fuselage;

Figure 18 is a side elevation similar in many respects to Figure 17, but showing three operative positions of the connecting means and wing;

Figure 23 is a plan view of an aircraft embodying a still further modified form of the invention;

Figure 24 is a front elevation of the device shown in Figure 23;

Figure 25 is a detail view of the connecting means between the wing and fuselage; and Figure 26 is an end elevation of the device shown in Figures 23 and 24 showing the wing in three operative positions.

Figure 6:
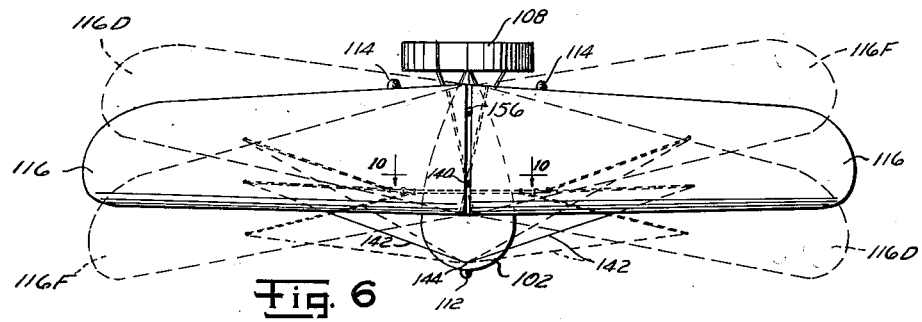
Figure 6 is a plan view of an aircraft embodying a modified form of the invention.
Figure 7:
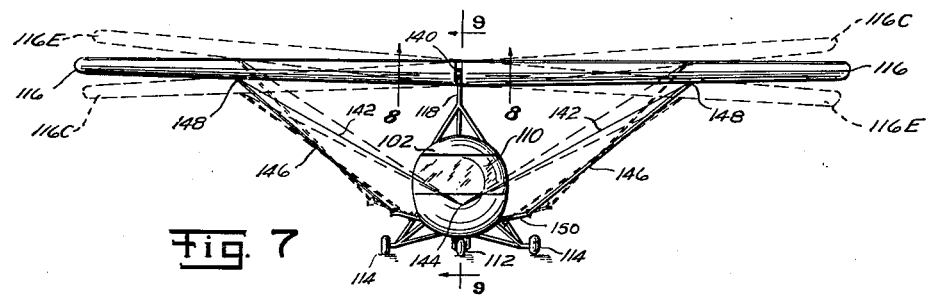
Figure 7 is a front elevation of the craft shown in Figure 6.

Referring more particularly to the embodiment of the invention illustrated in Figures 1 to 5, there is shown for purposes of illustrating this invention an aircraft having a fuselage 2. The fuselage may, of course, be of any desired form, the one illustrated being of the type wherein an engine, positioned at the rear end 4 of the fuselage is employed to drive a propeller 6 to propel the craft. A ring 8 may, if desired, surround the propeller 6 to increase the efficiency of the propeller and to stabilize the craft while in flight. The illustrated fuselage 2 is of the type wherein a passenger compartment 10 is provided in the forward extremity of the craft. The craft may be supported while on the ground by a single wheel 12 positioned at the front portion of the fuselage, and by a pair of spaced wheels 14 positioned at the rear portion of fuselage.

A main supporting wing 16 is provided to support the craft while in flight. The wing 16 may be supported above the fuselage 2 by means of a pylon 18, fixed to the fuselage 2, and a connection 20. The connection 20 is preferably of such a type as to permit movement of the wing about oppositely disposed axes. One desirable arrangement comprises a pair of spaced arms 22 carried by the pylon 18. The arms 22 may be interconnected by means of a link 24 pivotally mounted with reference to the arms. The link 24 carries an oppositely directed link 26 pivotally mounted in the central section of the wing 16 as more clearly illustrated in Figure 4. The link 26 may of course engage the wing at any desired angle; however, I prefer to dispose the link 26 at an angle of approximately 45° with reference to the wing, as indicated in Figure 4.

The craft may be controlled longitudinally, that is, to gain altitude or to descend by oscillating the wing 16 about the link 24 to vary the angle of attack of the wing 16 with reference to the fuselage 2 by means of a manually operable control member 28. Assume that the craft flies level when the wing 16 is in the position shown in full lines in Figure 3 while the propeller 6 is being driven at a given speed. If the trailing edge of the wing is depressed toward the position marked 16A, the angle of attack of the wing with reference to the fuselage is increased, and the craft will gain altitude. If the trailing edge of the wing is raised toward the position marked 16B the angle of attack of the wing with reference to the fuselage is decreased, and the craft will lose altitude or descend.

The craft may be controlled laterally, that is, to change the direction of flight, by oscillating the wing about the link 26, to vary the angle between the longitudinal axis of the wing and the longitudinal and lateral axes of the fuselage by means of a manually operable control member 30.

To execute a turn to the right the control member 30 is actuated to oscillate the wing 16 about the link 26 toward the position indicated at 16C on Figure 2 and toward the position indicated at 16D on Figure 1. It will be observed that the wing drops or banks in the direction of the turn as indicated on Figure 2, and that it oscillates in the direction of the turn as indicated on Figure 1 to facilitate turning the craft in the desired direction. More uniform and positive control of the craft is thus effected since the direction of the force exerted by the main supporting wing is shifted to urge the craft in the desired direction.

To execute a left turn the control member 30 is actuated to move the wing toward the positions 16E and 16F on Figures 2 and 1 respectively to change the direction of the force exerted by the wing 16 to directionally control the craft.

The embodiment of the invention illustrated in Figures 6 to 11 is similar in many respects to the embodiment illustrated in Figures 1 to 5; corresponding parts have therefore been given corresponding reference numerals with the addition of 100.

It will be observed that the wing 116 is pivotally mounted on the pylon 118 by means of a universal joint 140. Diagonally disposed brace members 142, connected preferably to the forward end of the fuselage 102, as at a point 144, engage the wing 116 intermediate the joint 140 and the ends of the wing. The brace members 142 restrain the wing to move substantially about the downwardly and forwardly inclined axis A—A, passing through the joint 140 and the point 144 shown on Figure 9, when the wing is displaced vertically and horizontally with reference to the fuselage toward the positions marked 116C and 116E on Figure 2, and toward the positions marked 116D and 116F on Figure 1, respectively, to control the craft laterally.

Figures 8, 9:
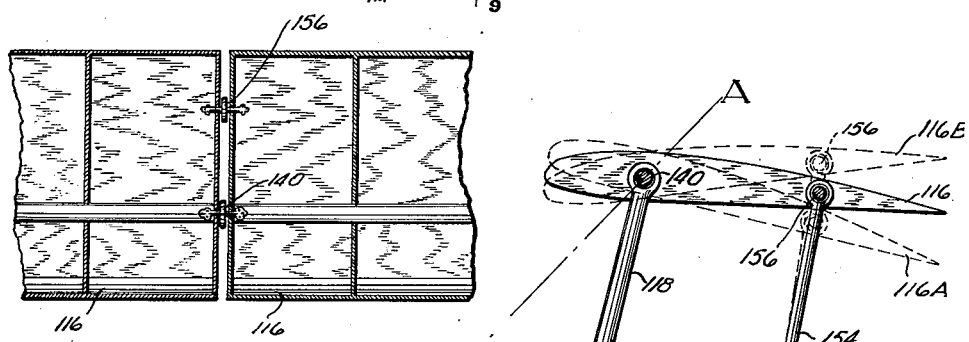
Figure 8 is a view taken on the line 8—8 of Figure 7.
Figure 9 is a fragmentary view taken substantially on the line 9—9 of Figure 7 showing the wing in three operating positions.
Figure 10:
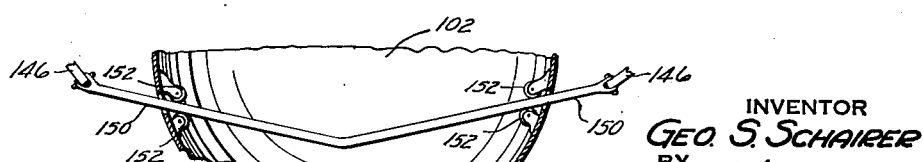
Figure 10 is a detail view showing a portion of the wing controlling mechanism shown in Figure 7.

Means are provided to oscillate the wing 116 about the axis A—A shown on Figure 9 to control the craft laterally. A pair of wing supporting struts 146, operably connected to the wing 116 at one end, preferably by means of universal joint connections 148, are provided to support the wing and to transmit force thereto to control the craft. The other end of the struts 146 are connected to a bar 150 mounted to move laterally with reference to the fuselage 102. The bar 150 may be supported on rollers 152 to facilitate lateral movement thereof. The bar 150 is preferably bent as illustrated in Figure 10 to direct the lateral force upwardly to facilitate exerting the controlling force on the angularly disposed struts 146. Any desired means may of course be employed to move the bar 150 laterally with reference to the fuselage 102 to effect the lateral control of the craft.

Longitudinal control of the craft may be accomplished by oscillating the wing 116 about the joints 140 and 148 as illustrated in Figure 9. The control may be effected by means of a manually operable link 154 connected to the wing 116 preferably by means of a universal joint 156. Oscillation of the wing 116 toward the position 116A increases the angle of attack of the wing and causes the craft to ascend or gain altitude. Oscillation of the wing 116 toward the position 116B decreases the angle of attack of the wing and causes the craft to descend or lose altitude.

The embodiment illustrated in Figures 11 to 14 is also similar in many respects to the embodiment illustrated in Figures 1 to 5. Corresponding parts have therefore been given corresponding reference numerals with the addition of 200.

In this embodiment of the invention the wing 216 is operably connected to the fuselage 202 by means of two pairs of links 260 and 262, laterally spaced with reference to the fuselage 202. The links 260 and 262 are connected to the fuselage 216 by means of hinged connections 264 and 266 respectively which permit lateral displacement of the links with reference to the fuselage. The distance between the hinges 266 is preferably greater than the distance between the hinges 264. The links 260 and 262 converge and are operably connected to the wing 216 by means of spaced universal joint connections 268.

Means including a manually operated control member 270 which may be connected to one of the links 260 or 262 are provided to oscillate the links 260 and 262 about the hinges 264 and 266 to move the wing 216 laterally with reference to the fuselage 202 to laterally control the craft. In view of the relation between the links 260 and 262, and the variation in the distance between the hinges 264 and 266, the lateral shifting of the wing 216 with reference to the fuselage 202 is accompanied by an oscillation of the longitudinal axis of the wing with reference to the longitudinal axis of the fuselage.

To control the craft laterally, the control member 270 is actuated to oscillate the links 260 and 262 about the hinges 264 and 266 respectively. The movement of the links is transmitted through the points 268 to move the wing 216 laterally with reference to the fuselage 202 toward the positions 216G or 216H on Figure 12 for right or left hand turns of the craft respectively.

Figure 11:
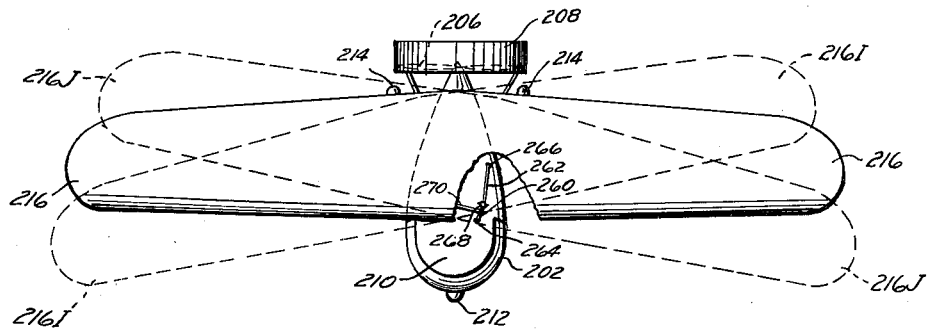
Figure 11 is a plan view of an aircraft showing a further modified form of the invention.
Figure 12:
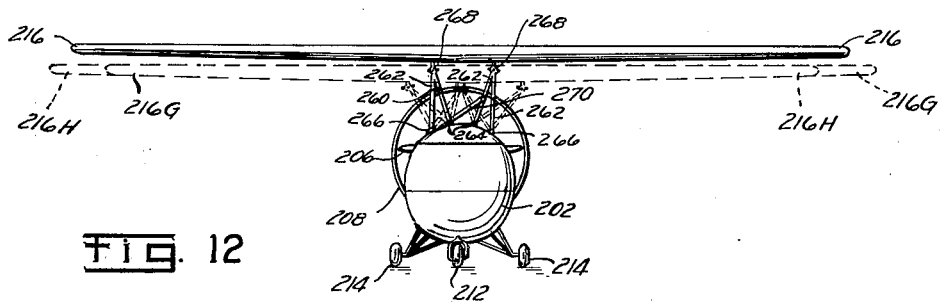
Figure 12 is a front elevation of the craft shown in Figure 11.
Figure 14:
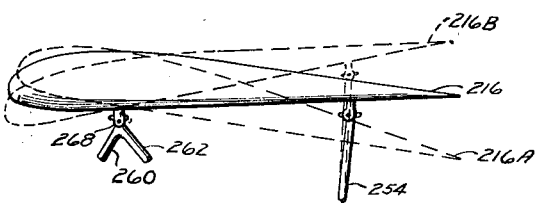
Figure 14 is a side elevation of the wing and connecting means illustrated in Figure 13 showing the wing in three operative positions.
Figure 13:
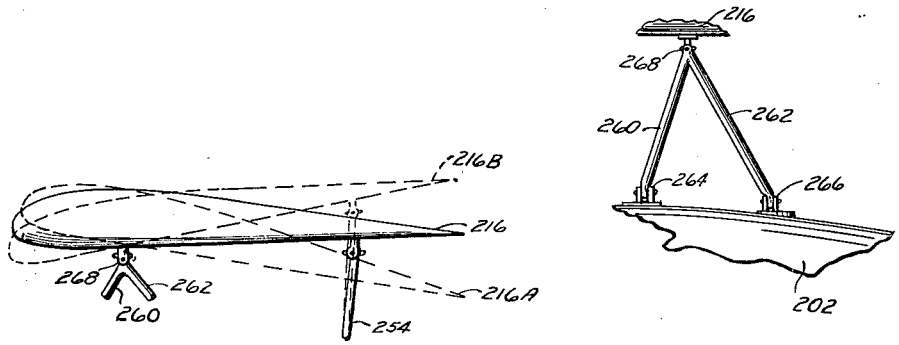
Figure 13 is a vertical section showing the connecting means between the wing and the fuselage of the craft.
Figure 19:
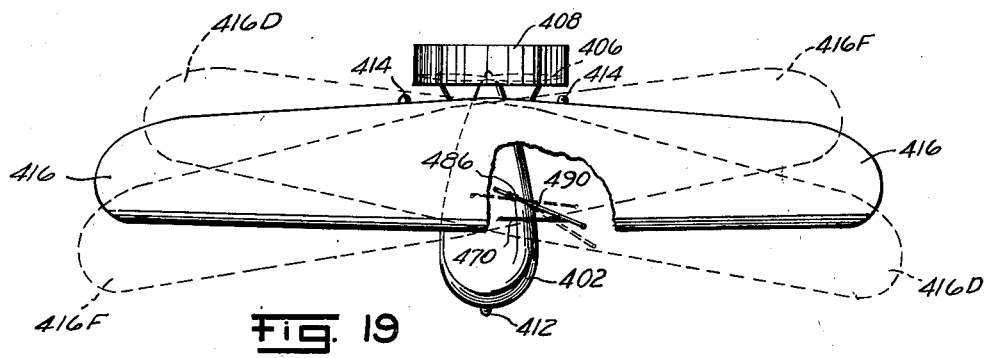
Figure 19 is a plan view of an aircraft showing a further desirable embodiment of the invention.

It will be observed that the lateral shifting of the wing toward the positions 216G or 216H on Figure 12 is accompanied by an oscillation of the wing toward the positions 216I or 216J on Figure 11 for right or left hand turns respectively.

Attention is directed to the fact that the lateral shifting of the wing with reference to the fuselage distributes a greater proportion of the lift force exerted by the wing on one side of the fuselage, thereby causing the craft to bank in the desired direction. The oscillation of the wing with reference to the fuselage causes the force exerted by the wing to be directed in the desired direction to facilitate lateral control of the craft.

Longitudinal control of the craft is effected by oscillating the wing about the connections 268 by means of a manually operable member 254 connected to the wing to vary the angle of attack of the wing 216 with reference to the fuselage 202. Oscillation of the wing toward the position 216A on Figure 14 increases the angle of attack of the wing, thereby causing the craft to climb, while oscillation toward the position 216B decreases the angle of attack, thereby causing the craft to descend.

In the embodiment illustrated in Figures 15 to 18 the wing 316 is connected to the fuselage 302 by means of two pairs of links 374 and 376, laterally spaced with reference to the fuselage 302. The links 374 and 376 are operably connected to the wing 316 and to the fuselage 302 by means of universal connections 378 and 380 respectively. The lateral distance with reference to the fuselage between the connections 378 and 380 at the fuselage 302 and at the wing 316, as well as the length of the links 374 and 376, may be varied to effect the desired lateral movement of the wing with reference to the fuselage, and the desired oscillatory movement of the wing with reference to the fuselage.

To control the craft laterally the manually operable member 370 is actuated to move the links 374 laterally with reference to the fuselage. The links 374 and 376 pivot in the universal connections 378 and 380 at the fuselage and wing respectively, to displace the wing laterally with reference to the fuselage, thereby increasing the proportion of lift exerted by the wing on one side of the fuselage to cause the craft to bank. Due to the variation in the distance between each pair of connections 378 and 380, and the variation in the length of the links 374 and 376, the lateral displacement of the wing with reference to the fuselage is accompanied by a yawing oscillation of the wing with reference to the fuselage to direct the force exerted by the wing in the desired direction to laterally control the craft.

To execute right or left hand turns respectively, the wing 316 is moved toward the position 316C or 316E respectively, on Figure 16, and toward the position 316D or 316F on Figure 15 to shift the direction of the force exerted by the wing 316 with reference to the fuselage 302 to directionally control the craft.

Longitudinal control of the craft may be accomplished by means of the manually operable member 354 connected to the wing 316 to change the angle of attack of the wing. Displacement of the wing toward the position 316A causes the craft to climb, and displacement toward the position 316B causes it to descend.

In the embodiment of the invention illustrated in Figures 19 to 22, the wing 416 is operably connected to the fuselage 402 by means of a pair of spaced pylons 484 fixed to the fuselage 402. The pylons 484 are operably connected to guides 486 preferably by means of universal joint connections 488. The guides 486 are provided with interiorly disposed anti-friction means adapted to engage slides 490 operably connected to the wing 416. Each of the slides 490 is connected to the wing at points 492 and 494 spaced longitudinally and laterally of the wing 416. The points of connection 494 of the slides 490 are positioned nearer the leading edge of the wing 416 than the points of connection 492 to effect an oscillation of the wing 416 with reference to the fuselage 402 when the wing 416 is displaced laterally with reference to the fuselage 402, as more clearly illustrated in Figure 19. Any desired means such, for example, as the manually operable member 470, may be employed to move the wing 416 laterally with reference to the fuselage 402.

It is not necessary that the slides 490 lie in a horizontal plane. They may be tilted to follow the dihedral of the lower wing surface and thus give a lifting action to the fuselage.

Figure 20:
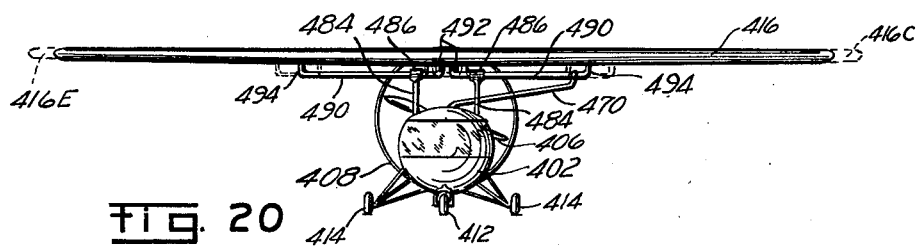
Figure 20 is a front elevation of the craft shown in Figure 19.
Figure 21:
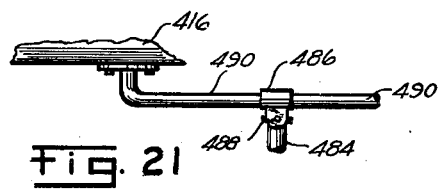
Figure 21 is a detail view of the connecting means between the wing and fuselage of the craft.
Figure 22:
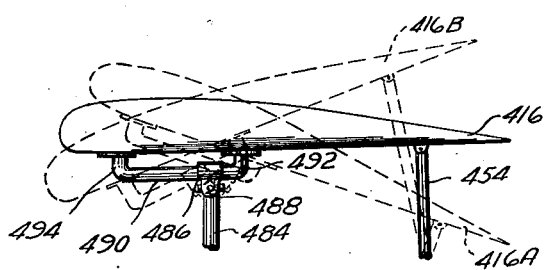
Figure 22 is an end elevation of the device shown in Figures 19 and 20 showing three operative positions of the main supporting wing.

To effect right or left hand turns of the craft, the member 470 is actuated to move the wing laterally with reference to the fuselage toward the position 416C or 416E respectively, on Figure 20. Due to the fact that the points of connection 492 between the slides 490 and the wing 416 are further removed from the leading edge of the wing than the points of connection 494 between the slides and the wing, the lateral displacement of the wing is accompanied by an oscillation of the wing toward the positions 416D and 416F respectively, on Figure 19, when the wing is displaced to effect right or left hand turns.

Longitudinal control of the craft may of course be effected by oscillating the wing about the universal joint connections 488, by means of the manually operable member 454, to increase or decrease the angle of attack of the wing by moving it toward the position 416A or 416B respectively, to cause the craft to ascend or descend.

In the modified embodiment of the invention illustrated in Figures 23 to 26, the wing 516 is operably connected to the fuselage 502 by means of a pair of spaced links 596 journalled in the fuselage 502, as more clearly illustrated on Figure 25. The links 596 are provided with angularly disposed forwardly extending segments 598, operably connected to the wing 516, preferably by means of universal joint connections 568.

The wing 516 may be laterally displaced with reference to the fuselage 502 to control the craft laterally by oscillating the links 596, by means of a manually operable control member 570 connected to one of the links 596. The angularly disposed segments 598 of the links 596 cause the wing to oscillate with reference to the fuselage, and to be displaced laterally with reference thereto when the links 596 are oscillated by the control member 570.

To effect right or left hand turns of the craft, the control member 570 is actuated to displace the wing 516 laterally toward the position 516C or 516E respectively, on Figure 24, and to cause oscillation of the wing with reference to the fuselage toward the position 516D or 516E respectively, on Figure 23.

The craft may be controlled longitudinally by means of the manually operable member 554 to cause oscillation of the wing about the universal joint connections 568 to move the wing toward the position 516A or 516B, thereby increasing or decreasing the angle of attack of the wing respectively, to cause the craft to climb or descend.

Attention is directed to the fact that this invention provides means for laterally controlling aircraft by causing a lateral shifting of the fuselage with reference to the wing, accompanied by a simultaneous yawing of the fuselage with reference to the wing. If desired, this action may be accompanied by a lifting or rolling of the fuselage with reference to the wing to cause the craft to return to the neutral position after the wing and fuselage have been displaced with reference to each other to effect lateral control of the craft. If desired, any suitable form of yielding means may be employed to facilitate a return to the neutral position rather than by causing a lifting or rolling action between the fuselage and the wing.

The longitudinal control of the craft may of course be effected by merely varying the angle of attack of the wing to cause the craft to gain altitude or descend.

It is of course understood that any desired type of fuselage may be employed, such, for example as the tractor mounted type wherein the source of power is mounted in front or at the sides of the passenger compartment, and that the invention is not limited to the monoplane supporting means, since it may also be employed with the multi-plane supporting structures if desired.

It is obvious of course that stops may be employed to limit the lateral and the longitudinal displacement of the wing with reference to the fuselage within desirable operating limits.

While the invention has been described with particular reference to several desirable embodiments, it is to be understood that the disclosure is illustrative only, and that various changes may be made in the constructional details as well as in the method by which the wing and fuselage may be interconnected to effect the desired results without departing from the spirit of the invention as defined by the following claims.

I claim:

1. In an aircraft having a fuselage, supporting wing means, connecting means between the fuselage and the wing means comprising spaced supports carried by the fuselage, angularly disposed longitudinally extending slides carried by the wing means, anti-friction means between the supports and the slides, and manually operable means to move the slides with reference to the supports to shift the wing laterally with reference to the fuselage and to oscillate the wing with reference to the fuselage to control the craft laterally.

2. In an aircraft having a fuselage, supporting wing means, connecting means between the fuselage and the wing means comprising spaced supports carried by the fuselage, longitudinally extending slides carried by the wing means, the outer ends of the slides being positioned nearer the leading edge of the wing than the inner ends of the slides, and manually operated means to move the slides with reference to the supports to shift the wing laterally with reference to the fuselage and to oscillate the wing with reference to the fuselage to control the craft laterally.

3. In an aircraft having a fuselage, supporting wing means, connecting means between the fuselage and the wing means comprising spaced supports carried by the fuselage, longitudinally extending slides carried by the wing means, the outer ends of the slides being positioned nearer the leading edge of the wing than the inner ends of the slides, manually operable means to move the slides with reference to the supports to shift the wing laterally with reference to the fuselage and to oscillate the wing with reference to the fuselage to control the craft laterally, and manually operable means to oscillate the wing about the slides to vary the angle of attack of the wing to control the craft longitudinally.

GEORGE S. SCHAIRER.